United States Patent [19]
Ceyzeriat et al.

[11] 3,965,280
[45] June 22, 1976

[54] USE OF ORGANOPOLYSILOXANE COMPOSITIONS WHICH CURE AT AMBIENT TEMPERATURE IN COATING ELECTRICAL AND ELECTRONIC DEVICES

[75] Inventors: Louis Ceyzeriat, Lyon; Michel Letoffe, Ste.-Fay-les-Lyon, both of France

[73] Assignee: Rhone-Poulenc S.A., Paris, France

[22] Filed: May 5, 1975

[21] Appl. No.: 574,394

Related U.S. Application Data

[62] Division of Ser. No. 447,501, March 4, 1974, Pat. No. 3,922,246.

[30] Foreign Application Priority Data
Mar. 7, 1973 France .................... 73.08143

[52] U.S. Cl. .................... 427/126; 427/387
[51] Int. Cl.$^2$ .................... B05D 5/12
[58] Field of Search ............ 427/58, 387, 126; 260/37.5 B, 46.5 E, 46.5 UA, 46.5 R

[56] References Cited
UNITED STATES PATENTS

| | | | |
|---|---|---|---|
| 3,796,686 | 3/1974 | Golitz et al. | 427/387 |
| 3,849,187 | 11/1974 | Fetscher et al. | 427/387 |

*Primary Examiner*—Cameron K. Weiffenbach
*Attorney, Agent, or Firm*—Stevens, Davis, Miller & Mosher

[57] ABSTRACT

Electrical and electronic devices are coated with an organopolysiloxane composition which consists essentially of a mixture of the following ingredients by weight:
i 100 parts of a α,ω-dihydroxydiorganopolysiloxane polymer, of viscosity at least about 600 cPo at 25°C,
ii 1 to 15 parts of an organosilicon compound which is either
a a monomer of the formula (A):
$R_xSi[(OCH_2CH_2)_aOR']_{4-x'}$, or
b a polymer resulting from the partial hydrolysis of at least one monomer of formula $Si(OR')_4$;
iii 0.2 to 6 parts of an organic derivative of titanium, which is either:
a a monomer of the formula (B): $Ti[OCH_2CH_2)_bOR'']_4'$,
b a polymer resulting from the partial hydrolysis of at least one monomer of the formula $Ti(OR'')_4$;
c a titanium chelate of the formula (C):

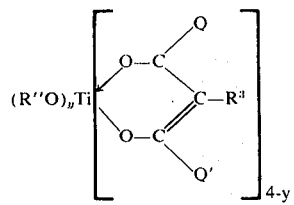

or d a titanium chelate of the formula (D):

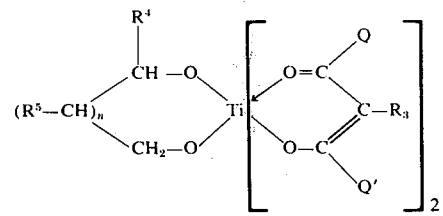

iv 0 to 100 parts of an optionally organosilicontreated inorganic filler;
v 0 to 100 parts of plasticiser and/or organosilicon stabiliser; and
vi 0.5 to 8 parts of an organosilicon resin consisting of units of the formulae $R'''(CH_3)_2SiO_{0.5}$ and $SiO_2$. The coating is then cured on the device. Neither the composition nor the elastomers obtained therefrom on curing corrode copper or other metals.

6 Claims, No Drawings

USE OF ORGANOPOLYSILOXANE COMPOSITIONS WHICH CURE AT AMBIENT TEMPERATURE IN COATING ELECTRICAL AND ELECTRONIC DEVICES

This is a division of application Ser. No. 447,501 filed Mar. 4, 1974, now U.S. Pat. No. 3,922,246.

The present invention relates to organopolysiloxane compositions, which are stable when stored in the absence of moisture and which cure rapidly, at ambient temperature or above, in the presence of water, for example the moisture in the atmosphere, to yield elastomers possessing good physical properties.

Organopolysiloxane composition which are stable when stored and which cure when exposed to the atmosphere to yield elastomers, are already known; they are prepared by mixing suitable practically neutral ingredients, mainly hydroxylic diorganopolysiloxane oils, alkoxysilanes and/or the products resulting from their partial hydrolysis, organic derivatives of titanium and inorganic fillers (see, for example, French Patents No. 1,266,528 and 1,330,625).

However, no one such composition, which is employed in such fields as gluing, caulking, coating electrical parts and coating woven fabrics, possesses all the properties and qualities which would promote their development on a large industrial scale. Thus, they rarely simultaneously possess quick setting at the surface so as to prevent dust from becoming embedded and avoid having to keep the coated parts immobile for a long period, good stability when stored, and the ability to yield elastomers having good mechanical properties.

The present invention provides new organopolysiloxane compositions which possess a combination of such qualities. These compositions are produced by mixing the following ingredients (the parts being by weight):

i 100 parts of $\alpha,\omega$-dihydroxydiorganopolysiloxane polymers, of viscosity at least 600 cPo at 25°C, consisting essentially of diorganosiloxy units, the organic radicals bonded to the silicon atoms being alkyl radicals with 1 to 3 carbon atoms, halogenoalkyl radicals with 3 or 4 carbon atoms, the vinyl radical, aryl or halogenoaryl radicals with 6 to 8 carbon atoms and cyanoalkyl radicals with 3 or 4 carbon atoms, with the proviso that at least 50% of these organic radicals are methyl radicals;

ii 1 to 15 parts of organosilicon compounds chosen from either.

a. monomers of formula (A):$R_xSi[(OCH_2CH_2)_aOR']_{4-x}$, in which R represents a hydrocarbon radical with 1 to 8 carbon atoms, R' represents an alkyl radical with 1 to 4 carbon atoms, and x and a independently represent zero or one, or b. polymers resulting from the partial hydrolysis of these monomers which correspond to formula (A) in which a and x are zero, that is to say $Si(OR')_4$;

iii 0.2 to 6 parts of organic derivatives of titanium, chosen from:

a. monomers of formula (B): $Ti[(OCH_2CH_2)_bOR'']_4$ in which R'' represents an alkyl radical with 1 to 10 carbon atoms and b represents zero, 1 or 2, such that when b is zero, the alkyl radical has 3 to 10 carbon atoms and when b is 1 or 2, the alkyl radical has 1 to 4 carbon atoms, b. polymers resulting from the partial hydrolysis of monomers of formula (B) in which b is zero, that is to say $Ti(OR'')_4$, and c. titanium chelates of the formula (C):

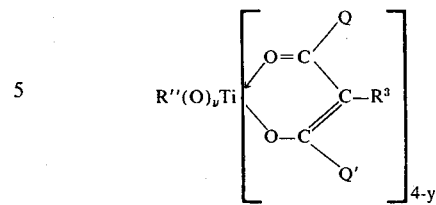

in which Q represents an alkyl radical with 1 to 4 carbon atoms, a phenyl radical or an alkoxy radical with 1 to 3 carbon atoms; R'' is as defined above in connection with formula (B) when b is zero; y represents 2 or 3; $R^3$ represents a hydrogen atom, a methyl radical or a chloromethyl radical; Q' represents an alkyl radical with 1 to 5 carbon atoms or a chloromethyl radical; or $R^3$ and Q' together represent, together with the two carbon atoms to which they are attached, a phenyl nucleus, in which case Q represents an alkoxy radical or a hydrogen atom; or (d) titanium chelates of formula (D):

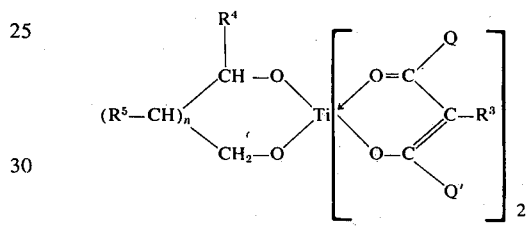

in which $R^4$ and $R^5$, which may be identical or different, represent hydrogen atoms or methyl radicals; Q, Q' and $R^3$ are as defined above in connection with formula (C); n represents zero or 1;

iv. 0 to 100 parts of inorganic filler which may or may not have been treated with organosilicon compounds; and v. 0 to 100 parts of plasticisers and/or organosilicon stabilisers. These compositions are characterised in that, in order to prepare them, 0.5 to 8 parts by weight of organosilicon resin consisting of units of the formulae $R'''(CH_3)_2SiO_{0.5}$ and $SiO_2$, in which R''' represents an alkyl radical with 1 to 3 carbon atoms or the vinyl radical and the ratio of the number of $R'''(CH_3)_2SiO_{0.5}$ units to the number of $SiO_2$ units is from 0.4/1 to 1.2/1, are added.

The $\alpha,\omega$-dihydroxydiorganopolysiloxane polymers used in the compositions of the present invention have a viscosity of at least 600 cPo at 25°C, and preferably 800 cPo at 25°C; they are oily or gummy products depending on their degree of polymerisation and the nature of the radicals bonded to the silicon atoms. They consist essentially of diorganosiloxy units but monoorganosiloxy units may be present in an amount up to 2% by number.

Examples of the organic radicals bonded to the silicon atoms include:

alkyl radicals with 1 to 3 carbon atoms, namely methyl, ethyl and propyl radicals, halogenoalkyl radicals with 3 or 4 carbon atoms, such as 3,3,3-trifluoro-propyl and 4,4,4-trifluoro-butyl radicals, aryl and halogenoaryl radicals with 6 to 8 carbon atoms, such as phenyl, tolyl, xylyl, chlorophenyl, dichlorophenyl, trichlorophenyl, tetrachlorophenyl ad trifluoromethylphenyl radicals, and cyanoalkyl radicals with 3 or 4 carbon atoms, such as beta-cyanoethyl and gamma-cyanopropyl radicals. Methyl radicals represent at least 50%, and preferaby 70% of the number of organic radicals. In order to make it possible for the compositions to set more rapidly, it is generally advantageous to use polymers, the viscosity of which is at most a few million cPo at 25°C, but nevertheless the use of gums with viscosities as high as 30 million cPo at 25°C can be considered with very reactive organosilicon compounds and very reactive organic derivatives of titanium. Furthermore, mixtures of polymers prepared by combining polymers of very different molecular weights, and thus also of very different viscosities, are perfectly suitable.

The techniques for the preparation of these dihydroxylic polymers are now well known; the technique mainly used consists of polymerising diorganocyclopolysiloxanes by means of a catalytic amount of an alkaline or acid agent and then treating the polymerisates with a calculated amount of water, (see, for example, French Pat. Nos. 1,198,749 and 1,134,005).

As already mentioned, 1 to 15 parts, and preferably 2 to 12 parts, of monomeric organosilicon compounds of formula (A): $R_xSi[(OCH_2CH_2)_aOR']_{4-x}$ or of polymeric organosilicon compounds resulting fom the partial hydrolysis of these monomers of the formula $Si(OR')_4$, are used per 100 parts of $\alpha,\omega$-dihydroxydiorganopolysiloxane polymers. Specific examples of hydrocarbon radicals with 1 to 8 carbon atoms, represented by R, include:

alkyl radicals with 1 to 3 carbon atoms namely methyl, ethyl and propyl radicals; the vinyl radical; and aryl radicals with 6 to 8 carbon atoms such as phenyl, tolyl and xylyl radicals.

Specific examples of alkyl radicals with 1 to 4 carbon atoms, represented by R', include methyl, ethyl, propyl, isopropyl and butyl radicals.

By way of indication, as monomers of formula (A), the following may be used, individually or as a mixture: methyltrimethoxysilane, methyltriethoxysilane, methyl-triisopropoxysilane, vinyltrimethoxysilane, vinyltriethoxysilane, phenyltrimethoxysilane, methyl-tris-(methoxyethoxy)-silane, ethyl-tris-(methoxyethoxy)-silane, vinyl-tris-(methoxyethoxy)-silane, propyl-tris-(methoxyethoxy)-silane, phenyl-tris-(methoxyethoxy)-silane, methyl silicate, ethyl silicate, propyl silicate, isopropyl silicate, butyl silicate, beta-(methoxy)-ethyl silicate and beta-(ethoxy)-ethyl silicate.

The polymers resulting from the partial hydrolysis of alkyl silicates of formula $Si(OR'')_4$, for example such silicates which have just been mentioned, consist, for the most part, of units of the formula $Si(OR')_2O$, with a small proportion of units of the formulae $(R'O)_3SiO_{0.5}$, $R'OSiO_{1.5}$ and $SiO_2$. Such polymers are usually characterised on the basis of their alkoxy or silica group content but it is often easier to measure the silica (a complete hydrolysis of a sample) than the alkoxy groups.

These polymers can be prepared by well known methods such as those described in "Chemistry and Technology of Silicones" by W. Noll, page 648 to 653. In order that the polymers produced shall be compatible with and/or shall react with the other ingredients employed in the compositions of this invention, it is however necessary that they should still possess the ability to dissolve in the usual hydrocarbon solvents such as toluene, xylene and methylcyclohexane, in an amount of at least 50 parts of polymer per 100 parts of solvent.

The organic derivatives of titanium, used in an amount of 0.2 to 6 parts, preferably 0.3 to 5 parts, per 100 parts of $\alpha,\omega$-dihydroxydiorganopolysiloxane polymers, are, as already indicated, monomers of formula (B), polymers resulting from the partial hydrolysis of alkyl titanates of formula $Ti(OR'')_4$ or chelates of formula (C) or (D).

Specific examples of alkyl radicals with 1 to 10 carbon atoms, represented by R'' in formulae (B) and (C), include, metyl, ethyl, propyl, isopropyl, butyl, isobutyl, hexyl, 2-ethyl-hexyl, octyl and decyl radicals.

specific examples of alkyl radicals with 1 to 4 carbon atoms and alkoxy radicals with 1 to 3 carbon atoms, represented by Q in formula (C), include, methyl, ethyl, propyl, isopropyl and butyl, methoxy, ethoxy, propoxy and isopropoxy radicals.

Specific examples of alkyl radicals with 1 to 5 carbon atoms, represented by Q', in formulae (C) and (D), include, methyl, propyl, isopropyl, butyl and pentyl radicals.

By way of indication, as monomers of the formula (B), the following compounds may be mentioned: propyl titanate, isopropyl titanate, butyl titanate, 2-ethylhexyl titanate, octyl titanate, decyl titanate, beta-(methoxy)-ethyl titanate, beta-(ethoxy)-ethyl titanate, beta-(propoxy)-ethyl titanate and that of the formula $Ti[(OCH_2CH_2)_2OCH_3]_4$.

The products resulting from the partial hydrolysis of titanates of formula $Ti(OR'')_4$, for example, the alkyl titanates mentioned above with the exception of the last three are polymers which can possess a linear structure consisting of a succession of units of the formula

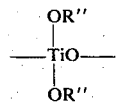

and/or a more complex structure, as indicated in "The Organic Chemistry of Titanium" by R. Feld and P. L. Cowe, pages 25 to 31. Furthermore, the structure of these polymers has a close relationship with the value of the molar ratio of the starting reagents, that is to say alkyl titanates/water, the nature of the radicals R'' and the conditions for carrying out the hydrolysis. In order to characterise these polytitanates, it is preferable, as for the polysilicates, to refer to their titanium oxide content, measured by complete hydrolysis of a sample. They should be stable and soluble in the usual hydrocarbon solvents in an amount of at least 50 parts of polytitanates per 100 parts of solvent.

the titanium chelates of formula (C) can be prepared by reacting alkyl titanates of formula $Ti(OR'')_4$ with beta-diketones, beta-keto-esters or substituted phenolic derivatives. By way of illustration, it is possible to use, as beta-diketones, those corresponding to the following formulae: $CH_3CO\text{-}CH_2CO\text{-}CH_3$, $CH_3(CH_2)_2CO\text{-}CH_2\text{-}CO\text{-}CH_3$, $(CH_3)_2\text{-}CHCO\text{-}CH_2CO\text{-}CH_3$, $CH_3(CH_2)_4COCH_2COCH_3$,

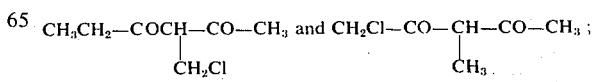

as beta-keto-esters, those corresponding to the following formulae: $CH_3COCH_2COOCH_3$ and $CH_3COCH_2COOC_2H_5$, and as substituted phenolic derivatives, salicylaldehyde, methyl salicylate, ethyl salicylate and propyl salicylate.

These chelates can be produced by simply mixing the reagents, at the rate of 1 to 2 mols of chelating agent per 1 mol of alkyl titanates, and removing the alcohol, R"OH, if necessary. Details of the working procedures are given by R. Feld and P. L. Cowe, loc cit. on pages 58 to 66.

In order to make it easier to bring them into contact with the other ingredients, it is particularly advantageous to use chelates which are liquid or which have rather low melting points, such as those corresponding to the formulae below:

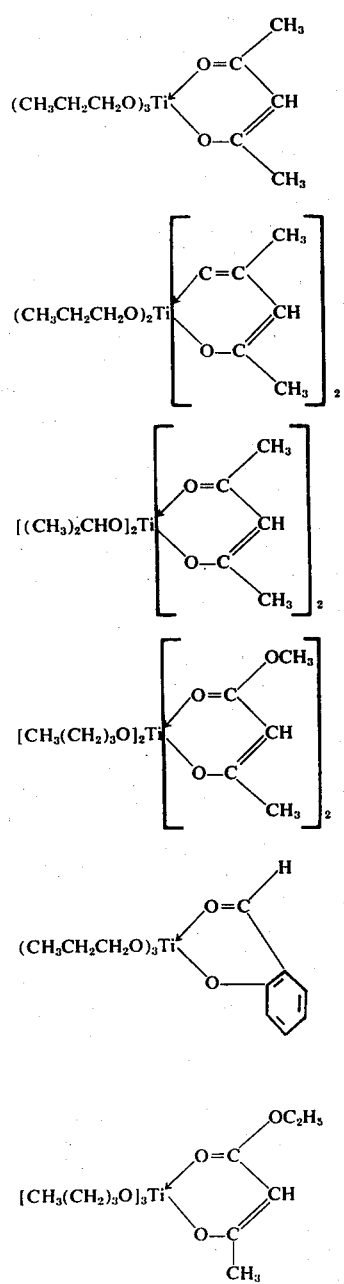

The chelates of formula (D) can be prepared in accordance with the process given in French Patent No. 2,121,289, by reacting dialkoxy-titanium chelates of formula (C) in which y is 2, with alkanediols such as ethylene glycol, 1-methyl-ethanediol, propane-1,3-diol, 1-methylpropane-1,3-diol and 2-methyl-propane-1,3-diol.

By way of indication, the chelates of the following formulae:

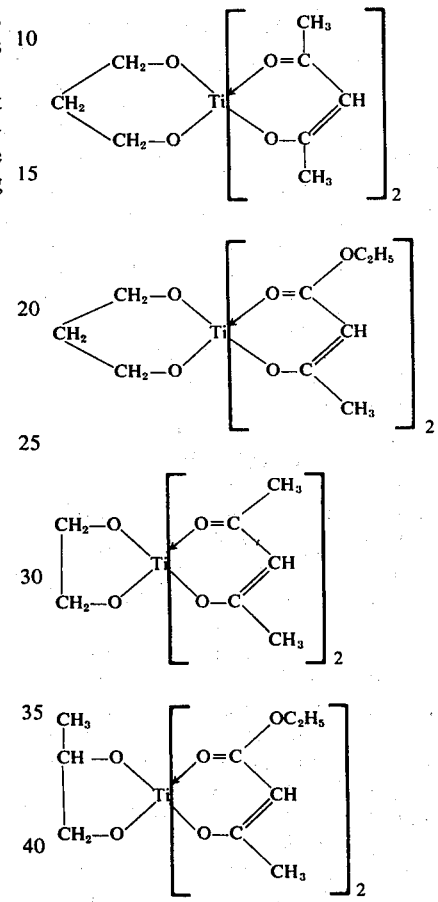

can be used.

Conventional inorganic fillers can be used to improve the mechanical properties of the elastomers produced by curing the compositions of the invention, in an amount of at most 100 parts, and preferably about 70 parts, per 100 parts of hydroxylic diorganopolysiloxane polymers.

Suitable fillers which can be employed include: inorganic materials, such as pyrogenic silica, precipitated silica, diatomaceous silica, ground quartz, aluminium silicates, mixed aluminium and magnesium silicates, zirconium silicate, mica powder, calcium carbonate, glass powder and glass fibres, titanium oxides of the pyrogenic oxide and rutile type, iron oxides, zinc oxide, aluminium oxide, zirconium oxide, magnesium oxide, graphite, conducting and non-conducting lamp blacks, asbestos and calcined clay; or organic materials, such as phthalocyanines, cork powder, sawdust, synthetic fibres and synthetic polymers, such as polytetrafluoroethylene, polyethylene and polyvinyl chloride.

They can, if desired, be surface-modified by treatment with organosilicon compounds usually employed for this purpose, such as diorganocyclopolysiloxanes, hexaorganodisiloxanes, hexamethyldisilazane and diorganocyclopolysilazanes (see, for example French Patents Nos. 1,136,884, 1,136,885 and 1,236,505, and British Patent Specification No. 1,024,234). These fillers thus modified contain, in the majority of cases, 3 to 30% of their weight of organosilicon compounds.

Also, apart from these fillers, plasticisers and/or organosilicon stabilisers can be present, in the same proportions, that is to say at most 100 parts, and preferably about 70 parts, per 100 parts of hydroxylic diorganopolysiloxane polymers. Suitable such products include:

$\alpha,\omega$-bis-(triorganosiloxy)-diorganopolysiloxane polymers of viscosity at least 10 cPo at 25°C, consisting essentially of diorganosiloxy units and at most 1% of monoorganosiloxy units, the organic radicals bonded to the silicon atoms being methyl, vinyl or phenyl radicals, at least 60% of these organic radicals being methyl radicals. The viscosity of these polymers can be as high as 30 or 40 millions of cPo at 25°C, and they thus comprise oils with a fluid to viscous appearance and soft to hard rubbers. They are prepared by the usual techniques, described more precisely in French Patent Nos. 978,058, 1,025,150 and 1,108,764; liquid, branched methylpolysiloxane polymers having 1.6 to 1.9 organic groups per silicon atom, consisting of $(CH_3)_3SiO_{0.5}$, $(CH_3)_2SiO$ and $CH_3SiO_{1.5}$ units and containing 0.3 to 6% of hydroxyl groups. They can be obtained by hydrolysis of the corresponding chlorosilanes, as disclosed in, for example, French Pat. No. 1,408,662; and diorganopolysiloxane oils blocked by hydroxyl and/or lower alkoxy groups, of low viscosity, generally from 2 to 1,000 cPo at 25°C, the organic radicals bonded to the silicon atoms being, as above, methyl, vinyl or phenyl radicals, at least 40% of these organic radicals being methyl radicals; methoxy, ethoxy, isopropoxy, propoxy, butoxy, isobutoxy and tertiary butoxy groups may be mentioned as chain-blocking lower alkoxy groups. They can be prepared by the usual techniques described for example in French Patents Nos. 938,292, 1,014,674, 1,116,196, 1,278,281 and 1,276,619.

These products generally play the role of plasticisers or stabilisers and sometimes of thixotropic agents or of agents which facilitate the extrusion of the compositions of the present invention. They can also modify certain physical properties of the elastomers formed, for example adhesion and hardness.

The organosilicon resins rsins which characterise the compositions of the invention are as already mentioned, polymers consisting of units of the formula $R'''(CH_3)_2SiO_{0.5}$ and $SiO_2$, used in an amount of 0.5 to 8 parts, preferably 0.8 to 7 parts, per 100 parts of hydroxylic diorganopolysiloxane polymers. Alkyl radicals with 1 to 3 carbon atoms, represented by R''' may be methyl, ethyl, isopropyl and propyl radicals.

These resins can be prepared easily from triorganohalogenosilanes and/or hexaorganodisiloxanes and sodium silicates, as described in French Patent No. 1,046,736, or from alkyl silicates and triorganohalogenosilanes, as described in French Patent No. 1,134,005. The reaction is generally carried out in inert diluents and the resins thus prepared can be stored in these diluents or the latter replaced wholly or partially by other diluents which are also inert. For example, toluene, xylene, cyclohexane, methylcyclohexane and chlorobenzene may be mentioned as suitable diluents. These resins possess varying amounts of hydroxyl groups bonded to silicon atoms, generally representing approximately 0.5 to 5% of their weight.

In order to prepare the compositions of the present invention, it is recommended that a device be used which makes it possible simultaneously to mix the various ingredients intimately in the absence of moisture and to remove the volatile materials present (solvents and polymers of low molecular weight).

The ingredients can be incorporated in any order whatsoever, at atmospheric pressure or below, and at a temperature ranging from ambient temperature to 200°C, it is however advantgeous, so as to prevent the mixtures from thickening suddenly and, consequently, to avoid time losses to render them fluid again, first to mix the $\alpha,\omega$,dihydroxydiorganopolysiloxane polymers, the fillers, the stabilisers and/or plasticisers, where appropriate, and the organosilicon resins under a pressure of approximately 5 to 30 mm Hg, at a temperature preferably above 80°C. This process makes it possible to remove the volatile substances and the water present and to form homogeneous, stable and anhydrous base compositions. Finally, the organosilicon compounds of formula (A) and/or the products resulting from the partial hydrolysis of alkyl silicates as well as the organic derivatives of titanium are added to these base compositions, preferably at atmospheric pressure and in a dry atmosphere, with vigorous stirring until homogeneity is achieved. Occasionally, in order to render the compositions thus prepared more fluid, it is recommended to heat them for at least 1 hour at a temperature above 100°C, and preferably for 2 to 3 hours at about 130°-150°C. Moreover, inert diluents, for example, toluene, xylene, heptane, white spirit, cyclohexane, methylcyclohexane trichloroethylene, tetrachloroethylene, ethyl acetate or butyl acetate, can be used to manufacture dispersions containing any proportion whatsoever of the compositions of the present invention.

The compositions, which may or may not have been diluted, are stable for at least 6 months, and generally for several years, when stored; they cure rapidly on simple exposure to the atmosphere or in the presence of traces of water. The rubbery products obtained possess good physical properties.

The compositions can thus be used in a variety of applications, such as jointing masonry, caulking boat bridges, gluing numerous materials, coating woven or non-woven products based on inorganic, organic or synthetic fibres, covering sheets made of plastics or cellulosic material and coating electrical and electronic equipment. They can thus be used, not only for cold-vulcanised silicone elastomers, but also for the protection of delicate electrical or electronic devices. They are particularly suitable for this last application because neither they nor the elastomers made from them corrode leads and other parts made of copper; moreover, they do not require the prior application of a adhesion undercoat to the metal in order to adhere effectively thereto; the same applies for numerous other metal substrates such as anodised or non-anodised aluminium, brass, bronze, tin, steel and zinc.

The following Examples further illustrate this invention; the parts are expressed by weight.

EXAMPLE I

The following compounds are mixed at 150°C for 3 hours, under a pressure of 10 mm of mercury so as to remove the volatile materials: $\alpha,\omega$-Dihydroxydimethylpolysiloxane oils of viscosity 20,000 cPo at 25°C . . . . 100 parts Pyrogenic silica with a large specific surface area, treated with octamethylcyclotetrasiloxane .... 18 parts 60% toluene solution of a resin consisting of $(CH_3)_3SiO_{0.5}$ and $SiO_2$ units, these units being in the numerical ratio 0.65/1 .... 3.9 parts. 3.9 parts of ethyl orthosilicate and 1.3 parts of butyl titanate are added at atmospheric pressure, with stirring and in the presence of a gentle stream of dry nitrogen, to the mixture thus formed, cooled to about 50°c. A composition E is obtained which has the appearance of a homogeneous and sticky paste. A portion $E_1$ of this composition E is spread, in the atmosphere, the relative humidity of which is 50%, on one of the two faces (previously coated with a non-stick agent) of glass plates. The layer deposited, of thickness approximately 2 mm, is non-sticky to the touch after 8 hours of exposure and after 24 hours it has changed, due to cross-linking, into a rubbery film which can be detached easily.

A second portion $E_2$ is aged in an accelerated manner by heating in a closed medium for 24 hours at 100°C, before being spread and cured like the portion $E_1$ on glass plates.

A third portion $E_3$ is placed in leakproof aluminium tubes for 6 months and then, after being stored for this period, it is spread on glass plates and cured in the manner indicated for the portion $E_1$.

The following physical properties are then measured on the elastomer films originating from the portions $E_1$, $E_2$ and $E_3$, these films being one week old: Shore hardness in accordance with ASTM Standard Specification D 676-59 T, tensile strength in $kg/cm^2$ and corresponding elongation in % in accordance with AFNOR Standard Specification T.46,002, dumb-bell shapes $H_3$, and modulus at 100% elongation, which represents the force in $kg/cm^2$ necessary to produce an elongation of 100% of samples cut up into dumb-bell shapes $H_3$. The results of these measurements are given in Table I.

elastomers are substituted for the composition E, it being understood that a new glass bottle equipped as indicated above is used for each of these compositions. The compositions used are described in Example 14 of French Patent No. 2,067,636, the crosslinking agents being organoiminoxyalkoxysilanes; in Example 2 of French Patent No. 1,432,799, the crosslinking agent being the disiloxane of the formula: $(CH_3CH=NO)_2(CH_3)Si\text{-}O\text{-}Si(CH_3)(ON=CH\text{-}CH_3)_2$; and in Example 2 of French Patent No. 1,198,749, the crosslinking agent being methyltriacetoxysilane. It is found that with all these compositions, the strips of copper become tarnished as a result of the formation of a greenish coating, the thickness of which inreases with time.

EXAMPLE II

The following ingredients are mixed at 170°C for 2 hours, under a pressure of 15 mm of mercury for the purpose of removing the volatile materials: $\alpha,\omega$-Dihydroxydiorganopolysiloxane oil of viscosity 35,000 cPo at 25°C, consisting of 95% of dimethylsiloxy units and 5% of diphenylsiloxy units .... 100 parts Pyrogenic silica with a large specific surface area, treated with hexamethyldisilazane .... 23 parts 60% xylene solution of a resin consisting of $(CH_3)_3SiO_{0.5}$,

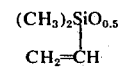

and $SiO_2$ units, these units being in the numerical ratio 2.3/0.5/3.5 .... 3.2 parts. 7 parts of an ethyl polysilicate containing 40% of silica and 2.5 parts of isopropyl titanate are introduced with vigorous stirring, at atmospheric pressure and under a gentle stream of dry nitro-

TABLE I

|  | Shore hardness | Tensile strength in kg/cm² | Corresponding elongation in % | Modulus at 100% elongation in kg/cm² |
|---|---|---|---|---|
| Portion $E_1$ | 22 | 23 | 350 | 4 |
| Portion $E_2$ | 26 | 24 | 320 | 4.3 |
| Portion $E_3$ | 25 | 26 | 340 | 4.2 |

By way of comparison, a compositon E' is prepared which is similar to the composition E but does not contain the resin consisting of $(CH_3)_3SiO_{0.5}$ and $SiO_2$ units. It is spread on glass plates and it is found that the layer deposited is still sticky to the touch after 24 hours of exposure to the atmosphere; it is necessary to wait for a further 48 hours of exposure in order to lift off the film resulting therefrom.

Furthermore, the following constituents are placed in a small glass bottle of capacity 30 cm³, which can be sealed by means of a screwed-in stopper: 2 cm³ of water, a freshly cleaned strip of copper, only a small part of which is immersed in the water, and a small test tube, kept open, containing 2 g of the composition E. The bottle is closed quickly and the appearance of the strip of copper is examined after one week; no change in its original colour is observed.

By way of comparison, compositions of the prior art which are stable when stored in the absence of moisture and which cure from ambient temperature to yield gen, into this mixture, cooled to about 140°C, and the whole is then mixed at this temperature for 2 hours. A slightly sticky, homogeneous composition F is thus obtained.

A portion $F_1$ of the composition F is spread on glass plates in the manner indicated in Example I. The layer deposited is non-sticky to the touch after 7 hours of exposure to the atmosphere and after 24 hours it has changed into a rubbery film which is easily detached from the plates.

Another portion $F_2$ of the composition F is aged by heating in a closed medium for 24 hours at 100°C, before being spread as above on glass plates. The layer deposited is non-sticky after 6 hours of exposure to the atmosphere.

The physical properties are measured, in the manner indicated in Example I, on the films originating from the portions $F_1$ and $F_2$.

The results of these measurements are given in Table II.

TABLE II

|  | Shore hardness | Tensile strength in kg/cm² | Corresponding elongation in % | Modulus at 100% elongation in kg/cm² |
|---|---|---|---|---|
| Portion $F_1$ | 37 | 48 | 390 | 9.5 |
| Portion $F_2$ | 40 | 47 | 380 | 10.5 |

A third portion $F_3$ is placed in leakproof aluminium tubes. After 8 months storage, the appearance of this portion $F_3$ is similar to that of a freshly prepared composition F; moreover, when cured in the atmosphere, it yields elastic films possessing physical properties, the values of which are similar to those given in Table II.

EXAMPLE III

The following ingredients are mixed at 155°C. for 3 hours, under a pressure of 10 mm of mercury for the purpose of removing the volatile materials: α,ω-Dihydroxydimethylpolysiloxane oil of viscosity 12,000 cPo at 25°C .... 100 parts α,ω-Dihydroxymethylphenylpolysiloxane oil of viscosity 550 cPo at 25°C .... 2 parts Pyrogenic silica with a large specific surface area, treated with octamethylcyclotetrasiloxane .... 5 .. Pyrogenic silica with a large specific surface area, treated with hexamethyldisilazane .... 15 parts 55 % methylcyclohexane solution of a resin consisting of $(CH_3)_3SiO_{0.5}$,

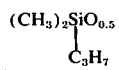

and $SiO_2$ units, these units being in the numerical ratio 0.35/0.15/1 ... 5 parts 4.4 parts of a compound of the formula $Si(OCH_2CH_2OCH_3)_4$ and 2 parts of a butyl polytitanate containing 33% of titanium oxide are incorporated with stirring, at atmospheric pressure and under a gentle stream of dry nitrogen, into this mixture, cooled to about 60°C. The composition thus formed is firm and thick and does not run when applied to vertical surfaces.

A portion thereof is deposited, in the manner indicated in Example I, on glass plates; the layer spread is non-sticky after 4 hours of exposure to the atmosphere and after 18 hours it has changed into a rubbery film which is detached easily from the plates.

After this film has been aged for 7 days, it possesses the following mechanical properties: Shore hardness 20, tensile strength in kg/cm² 17, corresponding elongation in % 470 and modulus at 100% elongation in kg/cm² 3. The other portion is packaged in sealed aluminium tubes. After 8 months storage, the appearance of the composition is similar to that of a composition which has just been prepared; the elastomer films produced therefrom also show physical properties which are quite normal, the values of which are similar to those given above.

EXAMPLES IV 4 different compositions $S_1$, $S_2$, $S_3$ and $S_4$ are used, each of which is prepared as described below: An α,ω-dihydroxydimethylpolysiloxane oil of viscosity 28,000 or 20,000 cPo at 25°C ... 100 parts a pyrogenic silica with a large specific surface area, treated with hexamethyldisilazane .... 18 parts and a 60% toluene solution of a resin consisting of $(CH_3)_3SiO_{0.5}$, and $SiO_2$ units, in the numerical ratio 0.65/1 ... 4 parts are mixed at a temperature of 150°C for 3 hours and under a pressure of 10 mm of mercury. 2 parts of a titanium chelate of the formula:

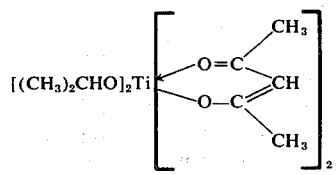

and 4 parts of an organosilicon compound chosen from amongst those of the formulae $CH_3Si(OCH_3)_3$, $C_2H_5Si(OCH_3)_3$, $CH_2=CHSi(OCH_2CH_2OCH_3)_3$ and $Si(OC_2H_5)_4$, are added, at atmospheric pressure and in the presence of a gentle stream of dry nitrogen, to the mixture thus formed, kept at a temperature of about 140°C. The whole is then mixed for 2 hours at a temperature of 140°C. Each composition obtained, which has the appearance of an unctuous paste, is divided into two substantially equal portions; one of the portions is spread on glass plates in the manner indicated in Example I. After a period of 24 hours, the rubbery films resulting therefrom are detached from the plates and then left for 7 days in the atmosphere. After this period of time, their physical properties are measured. The values found are as follows:

TABLE III

| Compositions | Viscosity of the oil in cPo at 25°C | Organosilicon compound | Physical properties | | |
|---|---|---|---|---|---|
| | | | Shore hardness | Tensile strength in kg/cm² | Corresponding elongation in % |
| $S_1$ | 28,000 | $CH_3Si(OCH_3)_3$ | 27 | 22 | 450 |
| $S_2$ | 28,000 | $C_2H_5Si(OCH_3)_3$ | 24 | 20 | 580 |
| $S_3$ | 20,000 | $CH_2=CHSi(OCH_2CH_2OCH_3)_3$ | 29 | 24 | 500 |
| $S_4$ | 20,000 | $Si(OC_2H_5)_4$ | 28 | 23 | 450 |

The other portion is spread, in the form of a layer of the thickness approximately 1 mm, on half of the surface of one of the 2 faces of 7 degreased metal plates, of dimensions 50 × 25 × 2 mm, each plate being made of a different metal, namely ordinary aluminium, anodised aluminium, tin, bronze, brass, steel and zinc.

The plates of the same metal are joined two by two, half-overlapping, coated face against coated face, and are left exposed to the atmosphere for 7 days. The adhesion to the metal plates of the elastomers thus formed is then evaluated by rupture of the combinations due to shear, using a tensometer. It is found that all the ruptures are cohesive, that is to say that they take place within the body of the elastomers and not at the plate-elastomer interfaces.

EXAMPLE V

The following compounds are mixed at 150°C for hours under a pressure of 10 mm of mercury: α,ω-Dihydroxydimethylpolysiloxane oil of viscosity 28,000 cPo at C.... 100 parts Pyrogenic silica with a large specific surface area, treated with hexamethyldisilazane ... 18 parts 60% toluene solution of a resin consisting of $(CH_3)_3SiO_{0.5}$ and $SiO_2$ units distributed in the numerical ratio 0.65/1 .... 4 parts 4 parts of n-propyl silicate, and 1.5 parts of a titanium chelate of the formula:

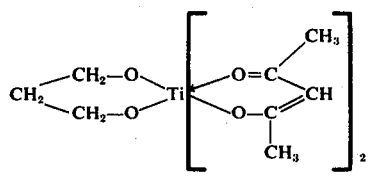

prepared in accordance with Example 2 of French Patent No. 2,121,289, are added, at atmospheric pressure and with stirring (the apparatus being isolated from the atmosphere by passing a gentle stream of dry nitrogen) to the mixture, cooled to about 50°C. An unctuous paste is obtained, a portion of which is spread in the atmosphere on glass plates in the manner indicated in Example 1. After the rubbery films resulting therefrom have been left in the atmosphere for 7 days, they possess a Shore hardness of 25, a tensile strength of 18 kg/cm$^2$ and a corresponding elongation of 380%. The other portion of the composition is aged by heating in a closed medium for 24 hours at 100°C and is then spread on glass plates as before; the films formed have physical properties, the values of which are of the same order as those given above.

We claim:

1. A process for coating an electric or electronic device which comprises applying to the device an organopolysiloxane composition which consists essentially of a mixture of the following ingredients, by weight:
    i. 100 parts of a α,ω-dihydroxydiorganopolysiloxane polymer, of viscosity at least about 600 19 cPo at 25°C, consisting essentially of diorganosiloxy units, the organic radicals bonded to the silicon atoms being selected from alkyl radicals with 1 to 3 carbon atoms, halogenoalkyl radicals with 3 or 4 carbon atoms, the vinyl radical, aryl or halogenoaryl radicals with 6 to 8 carbon atoms or cyanoalkyl radicals with 3 or 4 carbon atoms, with the proviso that at least 50 % of these organic radicals are methyl radicals;
    ii. 1 to 15 parts of an organosilicon compound which is either:
        a. a monomer of the formula (A): $R_xSi[(OCH_2CH_2)_aOR']_{4-x}$, in which R represents a hydrocarbon radical with 1 to 8 carbon atoms, R' represents an alkyl radical with 1 to 4 carbon atoms, and x and a independently represent zero or 1, or
        b. a polymer resulting from the partial hydrolysis of at least one monomer of formula $Si(OR')_4$, in which R' is as defined above;
    iii. 0.2 to 6 parts of an organic derivative of titanium, which is either:
        a. a monomer of the formula (B): $Ti[(OCH_2CH_2)_bOR'']_4$, in which R'' represents an alkyl radical with 1 to 10 carbon atoms and b represents zero, 1 or 2; such that when b is zero, the alkyl radical has 3 to 10 carbon atoms and when b is 1 or 2, the alkyl radical has 1 to 4 carbon atoms,
        b. a polymer resulting from the partial hydrolysis of at least one monomer of the formula $Ti(OR'')_4$, in which R'' represents an alkyl radical with 3 to 10 carbon atoms,
        c. a titanium chelate of the formula (C):

$$\left[(R''O)_y Ti \begin{pmatrix} O=C \diagdown \\ O-C \diagup \end{pmatrix} \begin{matrix} C-R^3 \\ Q' \end{matrix}\right]_{4-y}$$

in which Q represents an alkyl radical with 1 to 4 carbon atoms, a phenyl radical or an alkoxy radical with 1 to 3 carbon atoms; R'' represents an alkyl radical of 3 to 10 carbon atoms; y represents 2 or 3 : R$^3$ represents a hydrogen atom, a methyl radical or a chloromethyl radical; Q' represents an alkyl radical with 1 to 5 carbon atoms or a chloromethyl radical; or R$^3$ and Q', together with the two carbon atoms to which they are attached, together form a phenyl nucleus, in which case Q represents an alkoxy radical or a hydrogen atom, or
        d. a titanium chelate of the formula (D):

$$\left[(R^5-CH)_n \begin{matrix} R^4 \\ CH-O \\ CH_2-O \end{matrix} Ti \begin{pmatrix} O=C \diagdown \\ O-C \diagup \end{pmatrix} \begin{matrix} C-R^3 \\ Q' \end{matrix}\right]_2$$

in which R$^4$ and R$^5$, which may be indentical or different, represent hydrogen atoms or methyl radicals; Q, Q' and R$^3$ are as defined above and n represents zero or 1;
    iv. 0 to 100 parts of an optionally organosilicon-treated inorganic filler;
    v. 0 to 100 parts of plasticiser and/or organosilicon stabiliser and;
    vi. 0.5 to 8 parts of an organosilicon resin consisting of units of the formulae R''' $(CH_3)_2SiO_{0.5}$ and $SiO_2$, in which R''' represents an alkyl radical with 1 to 3 carbon atoms or the vinyl radical and the ratio of the number of R''' $(CH_3)_2SiO_{0.5}$ units to the number of $SiO_2$ units is from about 0.411 to about 1.2/1, and curing the composition on the device.

2. A method according to claim 1, in which the organosilicon compound is selected from methyltrimethoxy-silane, ethyltrimethoxysilane, vinyl-tri-(β-methoxyethoxy)-silane, ethyl silicate, propyl silicate, β-methoxyethyl silicate or ethyl polysilicate containing 40% of silica.

3. A method according to claim 1, in which the organic derivative of titanium is selected from isopropyl titanate, butyl titanate, butyl polytitanate containing 33% of titanium oxide, or a chelate of the formula:

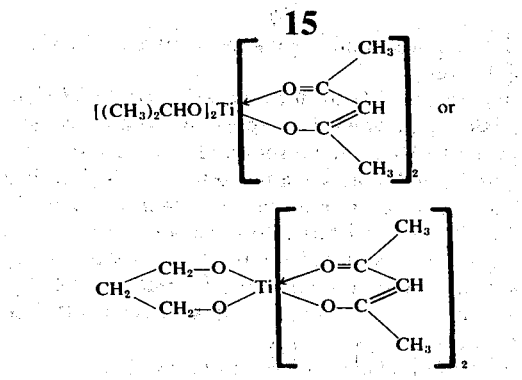
4. A method according to claim 1 in which component (ii) is present in an amount from 2 to 12 parts.
5. A method according to claim 1 in which component (iii) is present in an amount from 0.3 to 5 parts.
6. A method according to claim 1 in which component (vi) is present in an amount from 0.8 to 7 parts.
* * * * *